United States Patent [19]

Weyers

[11] 4,327,296
[45] Apr. 27, 1982

[54] WAVE-POWERED MOTOR

[75] Inventor: Paul F. R. Weyers, Sunnyvale, Calif.

[73] Assignee: Lockheed Missiles & Space Company, Inc., Sunnyvale, Calif.

[21] Appl. No.: 223,283

[22] Filed: Jan. 8, 1981

[51] Int. Cl.$^3$ .......................... F03B 13/10; H02P 9/04
[52] U.S. Cl. ........................................ 290/53; 290/42; 415/7; 60/496
[58] Field of Search ....................... 290/42, 53; 60/496, 60/398; 416/84–86; 415/7; 417/330, 331, 333, 337

[56] References Cited

U.S. PATENT DOCUMENTS

4,137,005 1/1979 Comstock ............................ 290/53
4,152,895 5/1979 Wirt ..................................... 60/398

*Primary Examiner*—J. V. Truhe
*Assistant Examiner*—Shelley Wade
*Attorney, Agent, or Firm*—John J. Morrissey

[57] ABSTRACT

A dome-shaped atoll structure (12) having a central aperture at its apex is secured to a station-keeping structure (11, or 40, or 52) positioned on the ocean bottom. The atoll structure (12) is moveable through a range of vertical positions relative to the ocean bottom. Sea waves impinging on the atoll structure (12) are refracted as they crest and break, thereby producing spiralling pulses of water that converge toward the central aperture. The central aperture provides entry into a vertical standpipe (14) for the pulses of water, which impart angular momentum to water already present in the standpipe (14). A turbine (31) attached to a shaft (28) in the standpipe (14) converts the rotational energy of the water in the standpipe (14) to rotational energy of the shaft (28), which is coupled to an electrical generator (27). The electric power output of the generator (27) is measured for various vertical positions through which the atoll member (12) is moved, so that a position of optimum power output can be determined for any given combination of sea state and/or tidal conditions.

24 Claims, 6 Drawing Figures

FIG_1

FIG_2

FIG—3

FIG_5

FIG_4

FIG_6

WAVE-POWERED MOTOR

Technical Field

This invention pertains to conversion of the energy in sea waves to electrical energy.

BACKGROUND ART

The present invention is an improvement on sea wave energy conversion apparatus of the kind described in U.S. Pat. No. 4,152,895, which issued on May 8, 1979 on an invention by Leslie S. Wirt.

The energy in sea waves in mid-ocean is approximately half kinetic and half potential. However, when encountering a sloping beach, the sea waves steepen and crest, and finally break into pulses of translationally rushing water having primarily kinetic energy. The water rushing onto the beach is technically no longer a "wave" in the sense of exhibiting undulatory motion, but nevertheless is customarily referred to in the literature as "the primary wave of translation". A sloping beach thus converts the energy in successive sea waves into pulses of kinetic energy.

If a sea wave encounters a beach having a generally umbrella-shaped or mushroom-shaped configuration as in the case of a generally circular island atoll, the incident wavefront is refracted by the beach in accordance with Snell's Law, as discussed, e.g., by R. S. Arthur in "Refraction of Water Waves by Islands and Shoals with Circular Bottom Contours," *Transactions American Geophysical Union*, Vol. 27, No. II, 1946. For typical ocean waves occurring in a costal zone around an island atoll, most of the wavefronts are refracted so as to assume generally spiralling paths around the atoll before breaking on the beach. The pulses of rushing water produced when the spiralling wavefronts break thus travel along paths that tend to converge at the interior of the atoll.

In accordance with the above-referenced Wirt patent, which is incorporated herein by reference, a man-made circular atoll having a central aperture is positioned to intercept energy-laden sea waves. The contour of the atoll beach causes successive sea waves impinging thereon to be refracted so as to acquire a spiralling motion while steepening and cresting. The cresting waves then break into pulses of translationally rushing water, which converge toward the central aperture. Guide vanes are mounted on the atoll to channel the pulses of rushing water into the central aperture with a swirling motion. A vertical standpipe of generally cylindrical configuration is connected to the atoll to receive the rushing water passing through the central aperture. The standpipe is filled with water, which acquires angular momentum due to angular impulses imparted thereto by the swirling motion of the pulses of rushing water entering the standpipe as successive sea waves impinge upon the atoll.

The kinetic energy of the pulses of rushing water produced as successive sea waves break on the atoll beach is stored in the angular momentum of the water in the standpipe. For this reason, the water in the standpipe is characterized as a "liquid flywheel." A turbine and attached shaft having a common rotational axis are positioned inside the standpipe, with the rotational axis of the turbine and shaft substantially coinciding with the cylindrical axis of the standpipe. The angular momentum of the water in the standpipe causes the turbine and shaft to rotate. An electrical generator is coupled to the shaft, so that the rotational energy acquired by the shaft is converted by the generator into electrical energy.

The turbine creates a pressure differential at the outlet of the standpipe. It is therefore preferable to provide a discharge diffuser at the standpipe outlet in order to obtain more efficient radial outflow of water from the standpipe, thereby facilitating entry of subsequent pulses of rushing water into the standpipe via the guide vanes as successive sea waves break on the atoll beach.

Until the present invention, however, the effect of sea state variations and tidal conditions on the efficiency of energy conversion provided by a circular atoll type of apparatus as described in the Wirt patent had not been fully recognized. For that reason, no provision was made in the prior art for adjusting a sea wave energy conversion apparatus of the circular atoll type to varying sea state and tidal conditions in order to maximize electrical power output.

Also, until the present invention, no provision was made for adjusting a sea wave energy conversion apparatus of the circular atoll type in order to obtain maximum electrical power output irrespective of changes in efficiency of the turbine or of the electrical generator. Furthermore, until the present invention, a sea wave energy conversion apparatus of the circular atoll type could not be submerged on command in order to minimize exposure of the apparatus to the damaging effects of violent storms.

DISCLOSURE OF INVENTION

It is an object of the present invention to obtain maximum efficiency in converting sea wave energy into useful rotational energy, in particular for the generation of electrical power.

It is also an object of the present invention to provide a sea wave energy conversion apparatus of the circular atoll type, which is adjustable to provide maximum electrical power output for any particular set of sea state and tidal conditions.

It is likewise an object of the present invention to convert the energy in sea waves into electrical energy by means of an apparatus that can be submerged for protection from the damaging effects of violent storms.

A sea wave energy conversion apparatus according to the present invention is adjustable to provide maximum electrical power output for any set of sea state and tidal conditions, and for any set of conditions affecting the integrity or functioning of structural components or electrical generating components of the apparatus. In the preferred embodiment, adjustment of the sea wave energy conversion apparatus of the present invention to meet conditions affecting electrical power output can be accomplished either manually or automatically.

An apparatus according to the present invention comprises a station-keeping means positioned beneath the sea, a wave energy conversion means secured to the station-keeping means for translational motion through a range of vertical positions, and means for moving the wave energy conversion means through the range of vertical positions to an optimally efficient position. In the preferred embodiments, the station-keeping means is secured to the sea bottom and the wave energy conversion means is tethered to or mounted on the station-keeping means. The wave energy conversion means functions as an impedance transformation means as defined in the above-referenced Wirt patent.

More particularly, the wave energy conversion means is a circular atoll structure having a central aperture at its apex. In the best mode presently contemplated for the practice of this invention, the atoll structure is tethered to the station-keeping means by cables that can be lengthened or shortened as required to change the vertical position of the atoll structure. Variable buoyancy tanks are attached to the atoll structure to maintain the atoll structure at a desired state of buoyancy. A vertical standpipe is coupled to the atoll structure to receive the pulses of water rushing along spiralling paths to the central aperture as successive sea waves crest and break on the atoll structure. An inlet structure comprising a plurality of guide vanes is affixed atop the atoll structure circumjacent the central aperture in order to channel the pulses of rushing water through the central aperture into the standpipe with a swirling motion.

The swirling motion of the pulses of water entering the standpipe imparts rotational motion to water already present in the standpipe. In effect, the water in the standpipe functions as a liquid flywheel that acquires angular momentum from the incoming pulses of water. A discharge diffuser is provided at the outlet of the standpipe to enhance the efficiency of radial outflow of water from the standpipe. A turbine and attached rotary shaft are positioned inside the standpipe to acquire rotational motion from the water in the standpipe, and an electrical generator is coupled to the upper end of the rotary shaft. Thus, the rotational energy of the shaft is converted to electrical energy. An electrical power transmission cable extends from the generator to a transformer or load, which would typically be located ashore.

In operation, the wave energy conversion means of the present invention can be moved vertically up and down relative to the station-keeping means, and the electrical power output for each vertical position is measured. In this way, an optimum vertical position of the wave energy conversion means can be determined for any given set of sea state and/or tidal conditions, or for any given condition of the turbine or other equipment. The apparatus can thus be tuned to provide maximum electrical energy output for the particular conditions prevailing at any given time for a given site. In the event of a violent storm on the surface of the sea, the wave energy conversion means can be submerged for protection from the damaging effects of the storm.

By extracting energy from the sea waves impinging thereon, an apparatus according to the present invention serves to provide a calmer sea state on the downstream or leeward side of the apparatus. A set of appropriately located wave energy conversion apparatus according to this invention could therefore be used to provide a calm water area in what would otherwise be an inhospitable sea state region.

BEST MODE OF CARRYING OUT THE INVENTION

Figure 1:
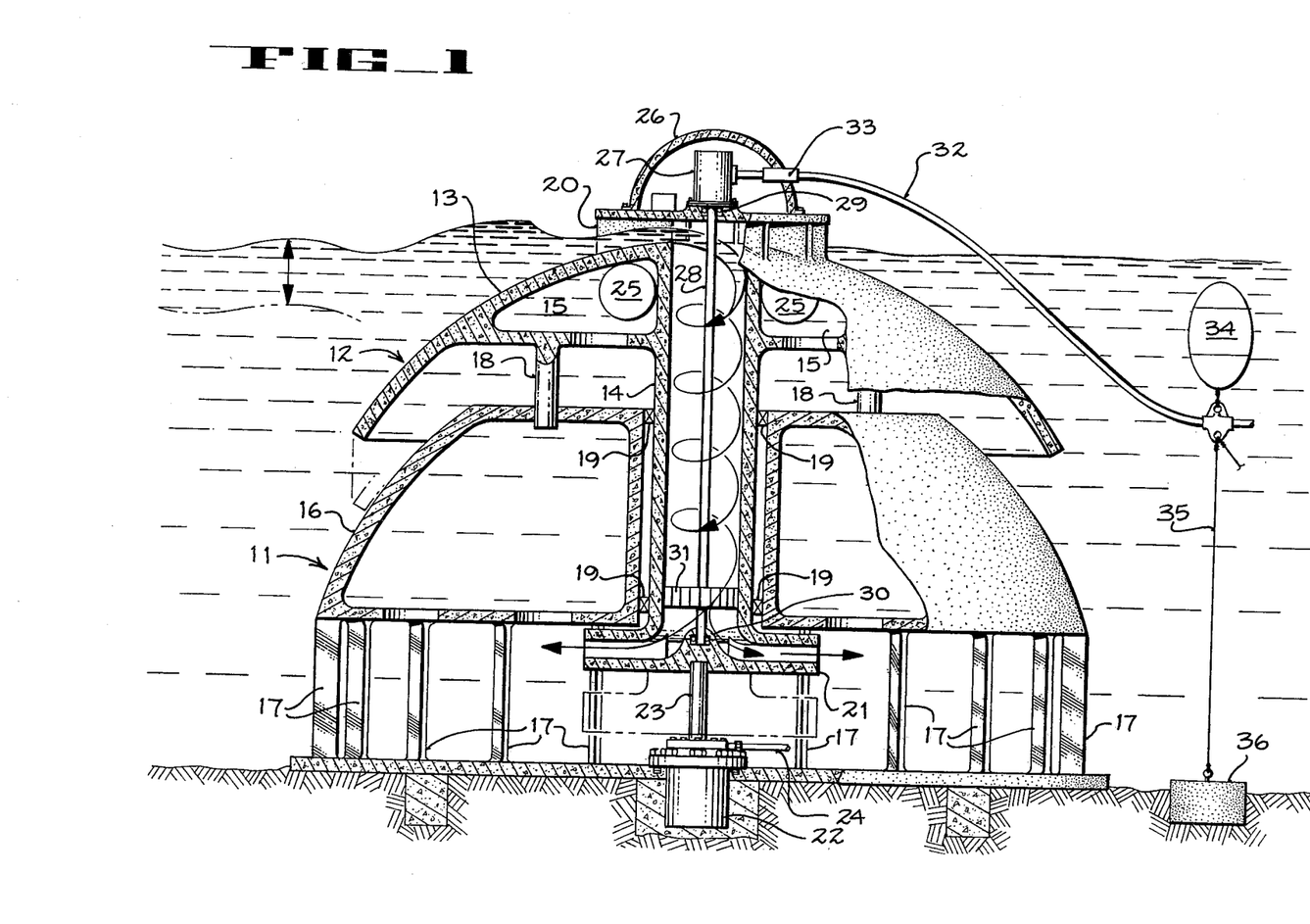
FIG. 1 is a cross-sectional view of an apparatus according to the present invention for extracting energy from sea waves.

In FIG. 1, an apparatus according to the present invention is shown for converting sea wave energy into electrical energy. The apparatus comprises a stationary foundation member 11 that is fixed in position on the ocean floor, and a moveable atoll member 12 mounted on the foundation member 11. The configuration of the atoll member 12 generally resembles the configuration of the upper portion of the wave-powered motor described in U.S. Pat. No. 4,152,895. However, unlike the wavepowered motor of the prior art, the atoll member 12 of the present invention is moveable in the vertical direction on command to assume a position of maximum energy conversion for any given set of sea state and/or tidal conditions.

The atoll member 12, which is of generally mushroom shaped exterior configuration, has a dome-like beach-forming portion 13 supported on a vertical cylindrical standpipe 14. There is a central aperture at the apex of the atoll member 12 to provide entry into the standpipe 14 for sea waves breaking upon the beach-forming portion 13. Internally, the atoll member 12 comprises one or more free-flooded compartments 15.

The foundation member 11 comprises a free-flooded base structure 16 preferably of prestressed concrete, which is mounted on a columnar support means. As illustrated in FIG. 1, the columnar support means comprises a plurality of evenly spaced vertical columns 17 positioned to support circumferential portions of the underside of the base structure 16. The columns 17 could be embedded directly in the ocean floor, or could be secured to a concrete slab on the ocean floor as shown in FIG. 1, depending on the extent of site preparation required by soil conditions on the ocean floor at the installation site.

The upper portion of the base structure 15 is configured to enable the underside of the atoll member 12 to nestle thereon. Locking pins 18 projecting from understructure on the atoll member 12 are received in corresponding detents or apertures on the upper portion of the base structure 16 to prevent rotation of the atoll member 12 relative to the foundation member 11. A generally cylindrical vertical passageway is provided centrally through the base structure 16 to receive the standpipe 14 of the atoll member 12. A conventional interface means 19, which could comprise bearing pads, rack and pinion devices, or saddle and guide rail devices, is provided between the standpipe 14 and the wall of the vertical passageway through the base structure 16. Bearing pads for use in such an application are described in *Marine Engineering*, edited by Roy L. Harrington, Society of Naval Architects and Marine Engineers, New York (1971), pages 382-384.

Sea waves impinging upon the beach-forming portion 13 of the atoll member 12 steepen, then crest, and finally break into pulses of rushing water. The circular configuration of the beach-forming portion 13 in the horizontal plane causes refraction of successive wavefronts in accordance with Snell's Law, so that the resulting pulses of water rushing onto the beach-forming portion 13 travel along spiralling paths that converge at the central aperture at the apex of the atoll member 12. A guide structure 20 is mounted atop the apex of the atoll member 12 circumjacent the central aperture. The guide structure 20 comprises a plurality of vanes that direct the spiralling pulses of water via the central aperture into the standpipe 14 with a swirling motion. The swirling pulses of water entering the standpipe 14 impart angular momentum to water already present in the standpipe 14. In effect, the water in the standpipe 14 functions as a liquid flywheel, which acquires angular momentum from the successive sea waves breaking on the beach-forming portion 13 of the atoll member 12.

The standpipe 14 extends through the central passageway of the base structure 16 to the volume enclosed by the columns 17 between the underside of the base structure 16 and the concrete slab on the ocean floor. The continual introduction of new pulses of water rushing into the standpipe 14 causes water to pass from the standpipe 14 into the volume underneath the base structure 16. In order to enhance the radial distribution of water exiting into this volume from the standpipe 14, a diffuser 21 is provided at the outflow end of the standpipe 14 in the preferred embodiment.

A feature of the energy conversion apparatus of the present invention is that the vertical height of the atoll member 12 can be adjusted in order to position the beach-forming portion 13 at the proper height for maximum extraction of energy from the sea waves impinging thereon. The proper position of the atoll member 12 relative to the ocean bottom for any given site fluctuates with tidal variations and sea state conditions. Thus, the ability to raise and lower the atoll member 12 on command provides a means for fine-tuning the energy conversion apparatus for maximum electrical energy generation.

In order to raise and lower the atoll member 12 through a range of vertical positions, a hydraulic jack can be used. In FIG. 1, a hydraulic jack is shown, which comprises a cylinder 22 embedded in the ocean floor and a piston 23 slidingly received within the cylinder 22. Also shown in FIG. 1 is a pressure line 24 through which a relatively incompressible fluid (typically oil) is supplied to or withdrawn the cylinder 22 so as to raise or lower the piston 23. The distal end of the piston 23 is secured to the underside off the diffuser 21, which is secured to the bottom end of the standpipe 14. As the piston 23 is raised or lowered, the vertical height of the atoll member 12 is concomitantly raised or lowered. In addition to (or instead of) the hydraulic jack, one or more variable buoyancy tanks 25 can be provided in the freeflooded compartments 15 of the atoll member 12 to enable the atoll member 12 to be raised or lowered on command.

A roof structure 26 is supported on the guide structure 20 to form a control room in which an electrical generator 27, among other items of equipment, is housed. The generator 27 is coupled to a vertical shaft 28, which extends coaxially within the standpipe 14 downward to the diffuser 21. A shown in FIG. 1, the shaft 28 is mounted for rotational motion on bearings 29 and 30 located on the guide structure 20 and the diffuser 21, respectively. A turbine 31 is connected to the shaft 28 near the bottom of the standpipe 14.

The angular momentum imparted to the water in the standpipe 14 by the incoming pulses of rushing water entering the standpipe 14 through the guide structure 20 causes the turbine 31 to rotate, thereby turning the shaft 28 and causing the generator 27 to produce electrical power. Thus, the rotational energy of the water in the standpipe 14 (i.e., the rotational energy of the liquid flywheel) is converted by the turbine 31 into rotary motion of the shaft 28, which in turn is converted to electrical power by the generator 27. A power cable 32 is connected to the generator 27 to transmit the electrical power so generated to an electrical power distribution system or load. As shown in FIG. 1, the power cable 32 exits from the control room through an electrically insulating penetration structure 33 passing through the roof structure 26. The cable 32 could be run along the ocean floor to the power distribution system or load, or it could be suspended by means of a floating or submerged buoy 34 as indicated in FIG. 1. The buoy 34 would be moored conventionally by means of a line 35 attached to an anchor or mooring block 36.

For any given set of sea state and/or tidal conditions, and/or equipment conditions, the atoll member 12 can be moved through range of vertical positions. The electrical power output of the generator 27 is monitored by conventional measuring techniques as the atoll member 12 is moved through a the various of vertical positions. In this way, the particular vertical position for the atoll member 12 at which electrical power generation is maximum can be precisely determined for any given set of operating conditions. Thus, the wave energy conversion apparatus can be continuously "fine tuned" so that maximum electrical power output can be maintained regardless of changes in tidal and sea states or in equipment efficiency. If sea state conditions become violent enough to threaten the structural integrity of the apparatus, the atoll member 12 can be completely submerged beneath the ocean surface for as long as is necessary to escape damage.

Figure 2:
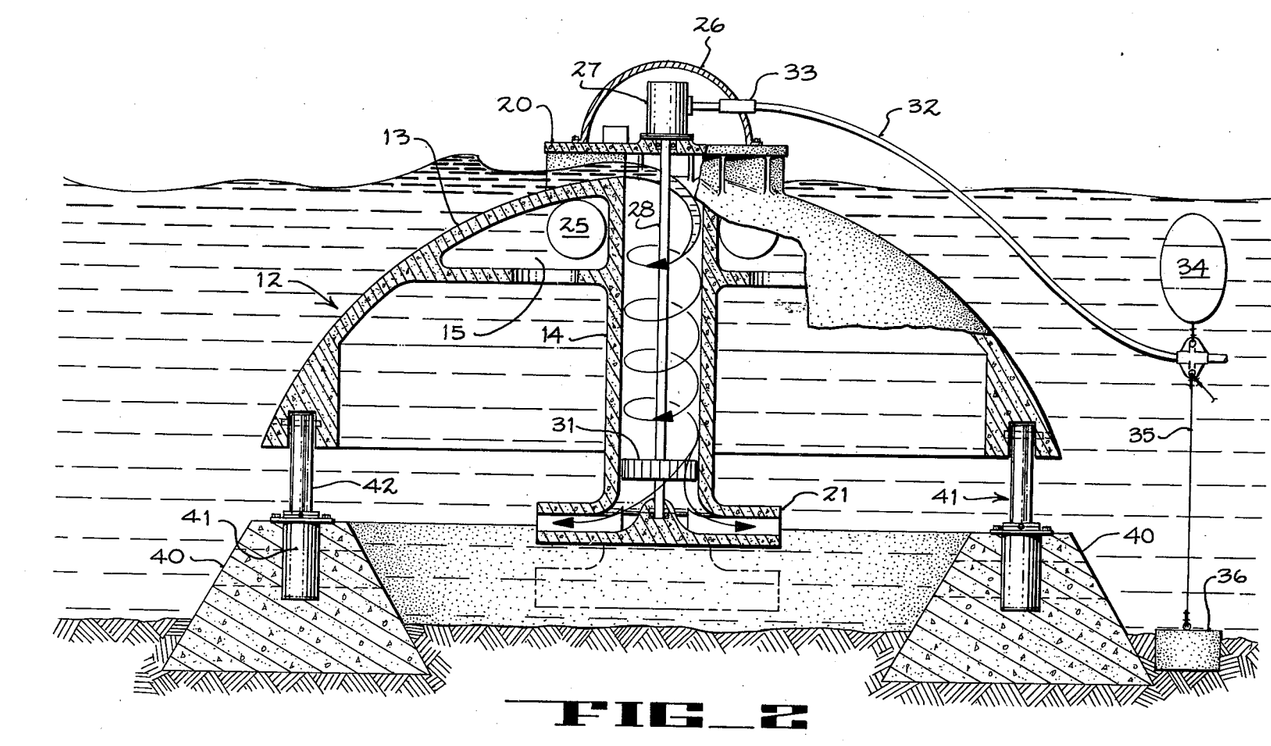
FIG. 2 is a cross-sectional view of an alternative apparatus according to the present invention for extracting energy from sea waves.

The embodiment illustrated in FIG. 1 requires relatively extensive site preparation and construction effort to build and position the foundation structure 11. In an alternative embodiment of this invention, as illustrated in FIG. 2, the foundation member 11 could be replaced by a plurality of reinforced concrete pilings 40 embedded in the ocean floor in a circular pattern underneath circumferential portions edge of the underside of the atoll member 12. A hydraulic jack is secured to each of the pilings 40 to raise and lower the atoll member 12 on command. As shown in FIG. 2, each jack comprises a cylinder 41 embedded in the corresponding piling 40 and a piston 42 slidingly received within the cylinder 41. The distal end of each piston 42 is secured to an edge portion of the underside of the atoll member 12, whereby the atoll member 12 is raised or lowered as the pistons 42 are raised or lowered. The various hydraulic jacks acting on the edge portions of the atoll member 12 replace the central hydraulic jack acting on the diffuser 21 of the embodiment shown in FIG. 1. In other respects, however, the configuration of the atoll member 12 of the apparatus of FIG. 2 is much the same as that of FIG. 1.

Figure 3:
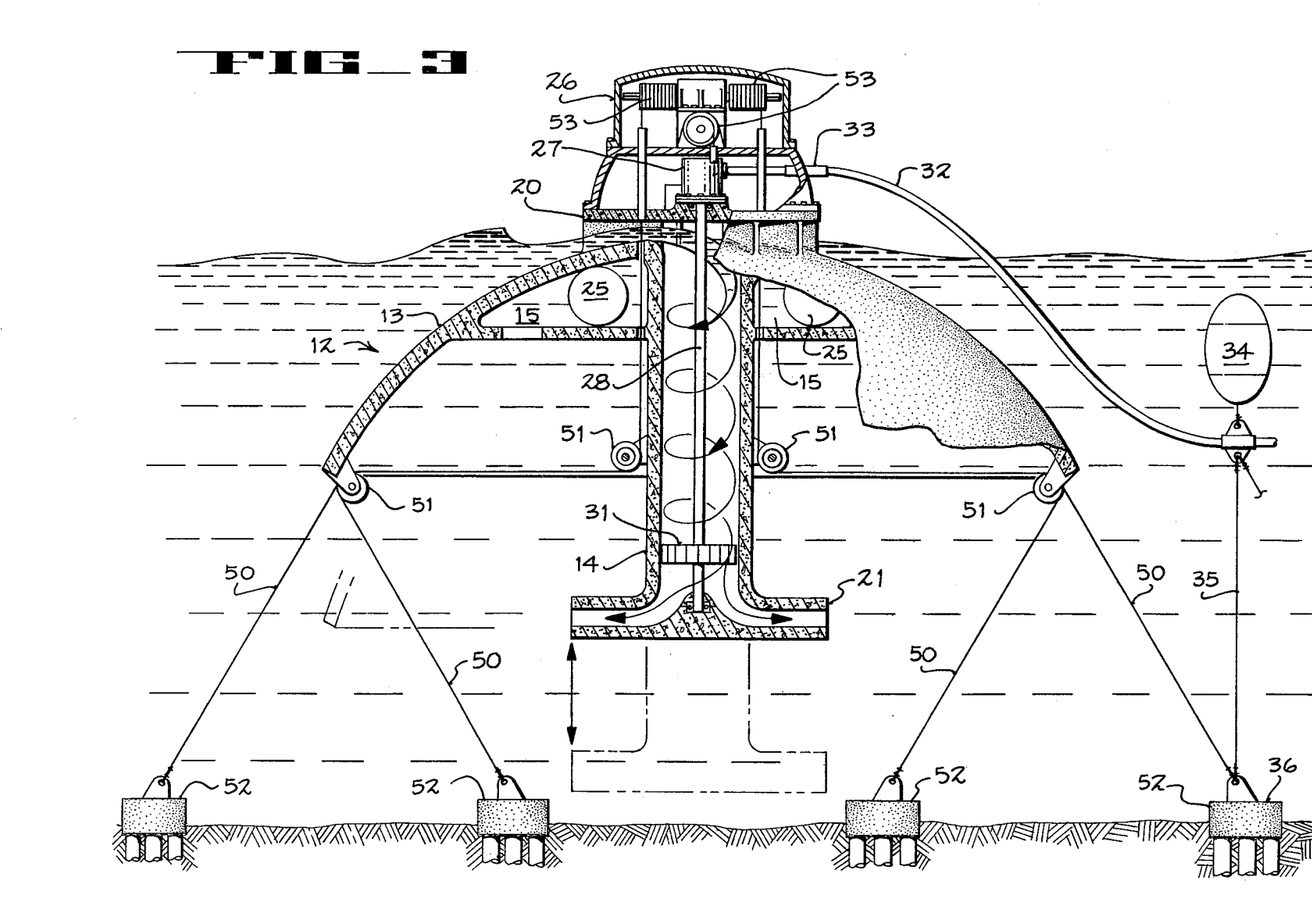
FIG. 3 is a cross-sectional view of another alternative apparatus according to the present invention for extracting energy from sea waves.
Figure 4:
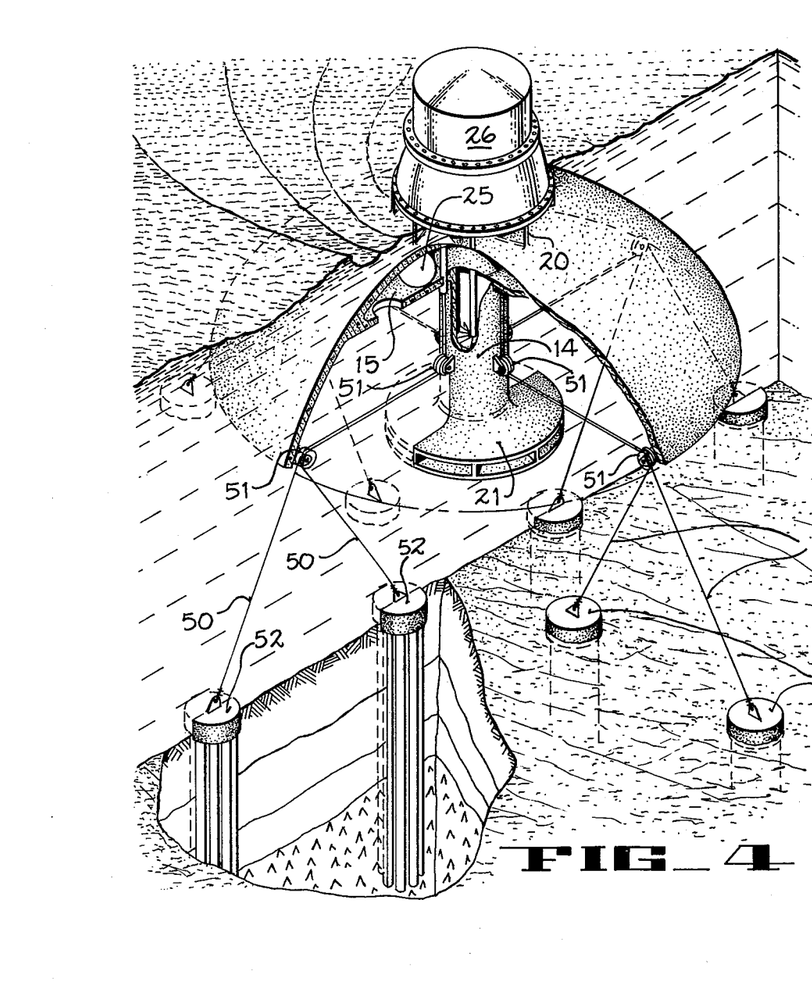
FIG. 4 is a cut-away perspective view of the apparatus of FIG. 3.

In a further development of the present invention, as shown in FIGS. 3 and 4, the hydraulic jacks of FIGS. 1 and 2 have been eliminated, and the atoll member 12 is secured by tethering cables 50 and pulleys 51 to pilings 52 embedded in the ocean floor. With the embodiment shown in FIGS. 3 and 4, the extensive site preparation required for the embodiment shown in of FIG. 1, and the relatively massive foundation structures required for the embodiments shown in FIGS. 1 and 2 have been eliminated.

As shown in cross-sectional view in FIG. 3, and perspective view in FIG. 4, vertical motion of the atoll member 12 can be adjusted by varying the length of the tethering cables 50 that secure the atoll member 12 to the pilings 52 The tethering cables 50 extend from the pilings 52 upward over pulleys or sheaves 51 to winches 53 located in the control room enclosed by the roofing structure 26. In FIG. 3, two crossed winches are shown, i.e., one winch whose axis lies in the plane of the paper and another winch whose axis is normal thereto. It is to be recognized, however, that the winches shown in FIG. 3 could be replaced by a system involving hydraulic jacks having locking stops to prevent payout of the tethering cables 50 in the event of rupture of the hydraulic jack seals. The number of tethering cables 50 determines the number of winches or hydraulic jacks needed in the control room.

The embodiment illustrated in FIGS. 3 and 4 requires minimal site preparation. It is not necessary that the installation site have a generally flat bottom, because the mooring technique as illustrated could also be used on a sloping bottom.

Figure 5:
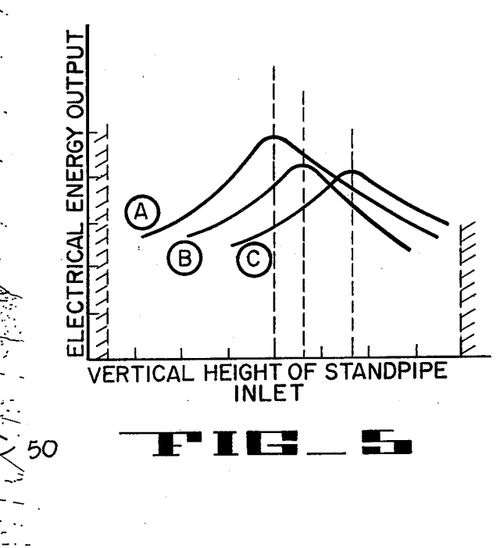
FIG. 5 is a graphical representation of the variation of electrical energy output with height of the standpipe inlet of an apparatus according to the present invention for three different sea state and/or tidal conditions.

FIG. 5 is a graphical representation of the variation of electrical energy output versus vertical height of the standpipe inlet of a wave energy conversion apparatus according to the present invention for three different sets of sea state and/or tidal conditions as represented by the curves A, B and C. For the conditions represented by a particular one of the curves, for example, by curve A, the electrical power output of the generator 27 measured in kilowatt hours would vary as indicated for various heights of the inlet of the standpipe 14 over the range of possible heights relative to the ocean bottom. Thus, for a given set of sea state and/or tidal conditions, a particular vertical height can be precisely determined for which electrical power output is a maximum. As shown by the curves A, B, and C in FIG. 5, the optimum height of the standpipe inlet varies with different sea state and/or tidal conditions. For fully automated operation, a wave energy conversion apparatus according to the present invention can be periodically run through a range of vertical positions (e.g., once per hour, or one per change of tide) to "track" the ever-changing optimum vertical height for maximum power output.

Figure 6:
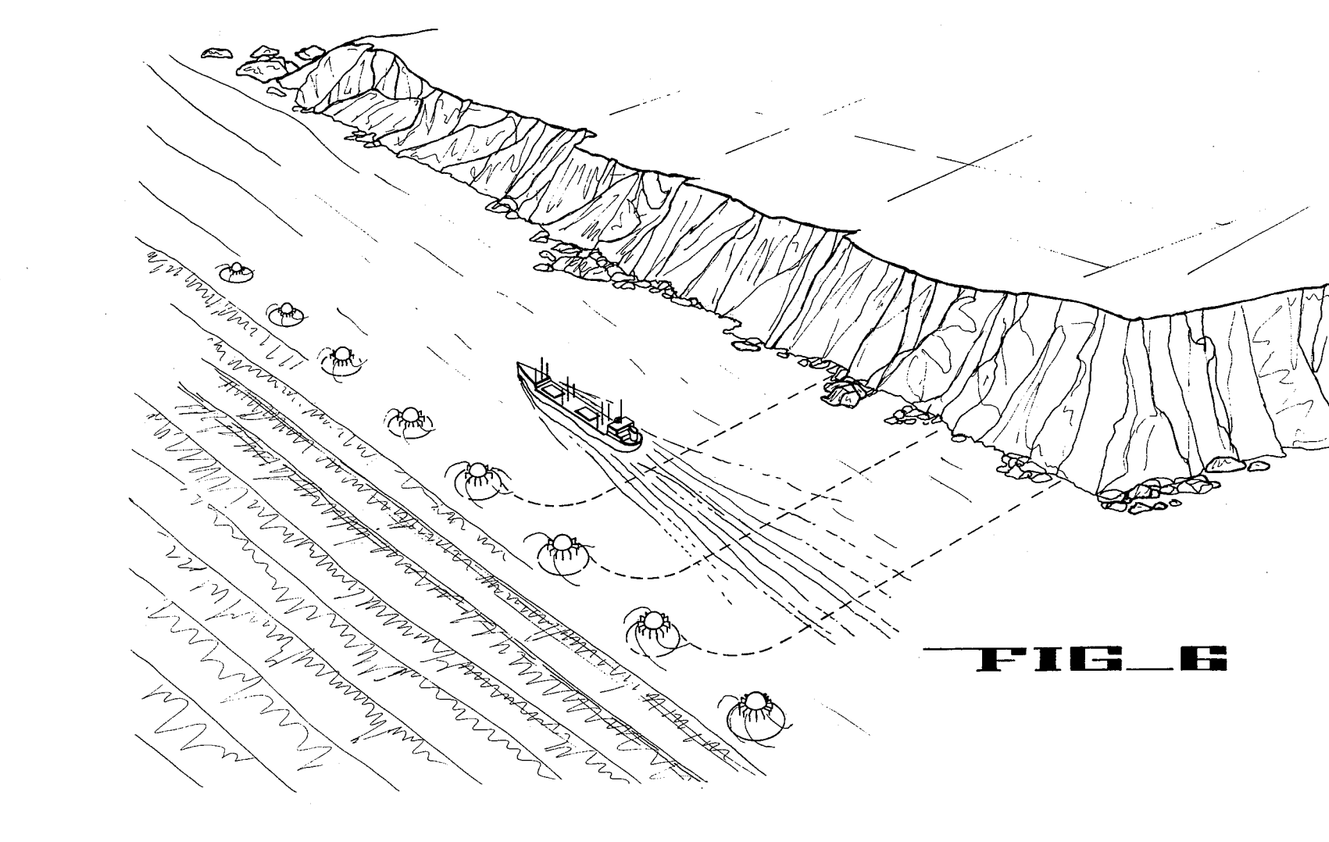
FIG. 6 is a perspective representation of a calm water channel formed with a plurality of apparatus according to the present invention.

Inasmuch as an energy apparatus according to the present invention provides a calmer sea state on the downstream or leeward side of the apparatus by extracting energy from the waves on the surface of the sea, a plurality of such apparatus could be arranged, as suggested in FIG. 6, to form an area of relatively calm water in a region than would otherwise have an inhospitable sea state.

The present invention has been described above in terms of particular embodiments. It is to be recognized, however, that variations in design detail would be suggested by the above disclosure and accompanying drawing to workers skilled in the art. Therefore, the above disclosure is to be considered as merely illustrative of the invention. The invention is defined by the following claims and their equivalents.

What is claimed is:

1. A method for extracting energy from sea waves, said method comprising the steps of:
   (a) positioning station-keeping means beneath the sea;
   (b) securing energy conversion means to said station-keeping means, said energy conversion means including:
      (i) an atoll member capable of vertical motion relative to said station-keeping means,
      (ii) a shaft secured to said atoll member, and
      (iii) means for converting energy of successive sea waves impinging on said atoll member into rotational energy of said shaft;
   (c) moving said energy conversion means through a range of vertical positions at which said successive sea waves impinge on said atoll member;
   (d) measuring energy conversion for said vertical positions in said range to determine a position at which conversion of energy from said impinging sea wave to rotational energy of said shaft is maximum for a particular set of sea state and tidal conditions;
   (e) maintaining said energy conversion means at said position of maximum energy conversion for said particular set of conditions as long as said conditions remain substantially unchanged;
   (f) moving said energy conversion means through other vertical positions in said range when new sea state conditions occur;
   (g) measuring energy conversion for said other vertical positions to determine a new position at which conversion of energy from said impinging sea waves to rotational energy of said shaft is maximum for said new sea state conditions; and
   (h) maintaining said energy conversion means at said new position of maximum energy conversion for said new sea state conditions as long as said new sea state conditions and said tidal conditions remain substantially unchanged.

2. The method of claim 1 wherein the positioning of said station-keeping means beneath the sea comprises affixing said station-keeping means to the sea bottom.

3. The method of claim 2 wherein the affixing of said station-keeping means to the sea bottom includes embedding said station-keeping means in the sea bottom.

4. The method of claim 1 wherein the securing of said energy conversion means to said station-keeping means comprises tethering said energy conversion means to said station-keeping means by cable means.

5. The method of claim 4 wherein the moving of said energy conversion means through said range of vertical positions comprises varying cable length for said cable means.

6. The method of claim 1 wherein:
   (a) said energy conversion means is positioned so that said successive sea waves impinging on said atoll member crest and break on said atoll member into pulses of translationally rushing water travelling along spiralling paths that converge toward an apertured portion of said atoll member;
   (b) a swirling motion is imparted to said rushing water by means of an inlet structure secured to said atoll member circumjacent said apertured portion, said rushing water passing via said inlet structure into a vertical standpipe coupled to said atoll member, the swirlig motion of said rushing water causing water present in said standpipe to acquire rotational energy; and
   (c) rotational energy is withdrawn from the water present in said standpipe by means of a turbine mounted on said shaft for rotational motion inside said standpipe.

7. The method of claim 6 wherein a discharge diffuser is positioned downstream of said turbine to enhance radial outflow of water from said standpipe.

8. The method of claim 1 wherein the maintaining of said energy conversion means at said position of maximum energy conversion for said particular set of conditions comprises using variable buoyancy means affixed to said atoll member.

9. The method of claim 6 wherein said shaft is coupled to an electrical generator, the rotational energy withdrawn from the water in said standpipe by said turbine being converted by said generator to electrical energy.

10. The method of claim 9 wherein the positioning of said energy conversion means at said position of maximum energy conversion for said particular set of conditions comprises positioning said atoll member at a position of maximum electrical energy generation for said particular set of conditions.

11. An apparatus for extracting energy from sea waves, said apparatus comprising:
 (a) station-keeping means positioned beneath the sea;
 (b) energy conversion means secured to said station-keeping means, said energy conversion means including: (i) an atoll member capable of vertical motion relative to said station-keeping means through a range of vertical positions, (ii) a vertical shaft secured to said atoll member, and (iii) means for converting energy of successive sea waves impinging on said atoll member into rotational energy of said shaft; and
 (c) means for moving said energy conversion means through said range of vertical positions to a position at which conversion of energy from said sea waves to rotational energy of said shaft is maximum for a particular set of sea state and tidal conditions.

12. The apparatus of claim 11 wherein said atoll member has an apertured portion, said atoll member being configured so that successive sea waves impinging thereon crest and break into pulses of rushing water travelling on said atoll member along spiralling paths that converge toward said apertured portion, and wherein said energy conversion means further comprises:
 (a) an inlet structure secured to said atoll member circumjacent said apertured portion, said inlet structure being configured to impart a swirling motion to said pulses of rushing water converging toward said apertured portion;
 (b) a standpipe coupled to said atoll member to receive said pulses of rushing water, the swirling motion of said rushing water causing water present in said standpipe to acquire rotational energy; and a turbine mounted on said shaft inside said standpipe so as to acquire rotational energy from the water in said standpipe.

13. The apparatus of claim 12 further comprising discharge diffuser means positioned downstream of said turbine to enhance radial outflow of water from said standpipe.

14. The apparatus of claim 12 wherein said energy conversion means is mounted on said station-keeping means for vertical motion in an interfacing relationship with a surface portion of said station-keeping means, locking means being provided to prevent substantial rotation of said energy conversion means relative to said station-keeping means.

15. The apparatus of claim 14 wherein said surface portion of said station-keeping means defines a cavity of generally vertical elongation, and wherein said standpipe is disposed for vertical motion with said cavity.

16. The apparatus of claim 15 comprising an interface means between said standpipe and said cavity-defining surface portion of said station-keeping means to enable vertical motion of said standpipe relative to said station-keeping means.

17. The apparatus of claim 16 wherein said interface means comprises a bearing pad made of graphite impregnated bronze.

18. The apparatus of claim 16 wherein said interface means comprises a rack and pinion.

19. The apparatus of claim 16 wherein said interface means comprises a saddle and guide rail.

20. The apparatus of claim 12 wherein said atoll member is of generally dome-like configuration, with said apertured portion being located at the apex thereof.

21. The apparatus of claim 11 further including variable buoyance means for enabling vertical motion of said energy conversion means relative to said station-keeping means.

22. The apparatus of claim 11 further including lifting jack means for enablng vertical motion of said energy conversion means relative to said station-keeping means.

23. The apparatus of claim 11 wherein said energy conversion means comprises:
 (a) impedance transformation means for receiving surface waves which are at least partly comprised of potential energy, and for converting said potential energy to kinetic energy;
 (b) inertial means having an input coupled to said impedance transformation means for receiving and storing said kinetic energy, and having an output from which continuous gradual withdrawal of said kinetic energy is obtained; and,
 (c) diffuser means for discharging the medium in which said surface waves are propagated, after having passed through said apparatus.

24. The apparatus of claim 11 wherein said energy conversion means comprises:
 (a) impedance transformation means immersed in sea water for interception of surface waves propagated therein, said waves comprising both potential and kinetic energy, and for converting said waves to pulses of predominately kinetic energy;
 (b) inertial means, having an input coupled to said impedance transformation means, for receiving and storing said pulses of kinetic energy, and having an output from which continuous gradual withdrawal of said kinetic energy is obtained;
 (c) kinetic energy converter means, having a rotating output shaft coupled to the output of said inertial means for changing the kinetic energy supplied thereto into a continuous rotary motion of said output shaft; and,
 (d) discharge means downstream of said converter means for expelling said sea water passing through said apparatus.

* * * * *